United States Patent
Byun et al.

(10) Patent No.: US 8,445,080 B2
(45) Date of Patent: May 21, 2013

(54) VERTICAL ALIGNMENT LAYER INCLUDING A POLYIMIDE AND LIQUID CRYSTAL DISPLAY INCLUDING THE SAME

(75) Inventors: Ho-Yun Byun, Asan-si (KR); Jeong-Uk Heo, Asan-si (KR); Ji-Yoon Jung, Asan-si (KR); Na-Young Shin, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 246 days.

(21) Appl. No.: 12/817,555

(22) Filed: Jun. 17, 2010

(65) Prior Publication Data

US 2011/0149220 A1    Jun. 23, 2011

(30) Foreign Application Priority Data

Dec. 21, 2009 (KR) .................. 10-2009-0128208

(51) Int. Cl.
*G02F 1/1337* (2006.01)
*C09K 19/00* (2006.01)

(52) U.S. Cl.
USPC ......................... 428/1.26; 349/123

(58) Field of Classification Search
USPC ......................... 349/123; 428/1.26
See application file for complete search history.

(56) References Cited

U.S. PATENT DOCUMENTS

2008/0068539 A1*  3/2008  Kaneko et al. ............... 349/106

FOREIGN PATENT DOCUMENTS

| JP | 2008-242445 | * | 10/2008 |
|---|---|---|---|
| KR | 2001-0032758 | * | 4/2001 |
| KR | 10-0312150 | | 10/2001 |
| KR | 1020020019930 | | 3/2002 |
| KR | 1020050044345 | | 5/2005 |
| KR | 1020050057043 | | 6/2005 |
| KR | 100601067 | | 7/2006 |
| KR | 1020070004025 | | 1/2007 |
| KR | 1020070060258 | | 6/2007 |
| KR | 100851787 | | 8/2008 |
| KR | 1020080097932 | | 11/2008 |
| KR | 1020090058994 | | 6/2009 |

* cited by examiner

*Primary Examiner* — Lauren Nguyen
(74) *Attorney, Agent, or Firm* — H.C. Park & Associates, PLC

(57) ABSTRACT

An alignment layer according to an exemplary embodiment of the present invention includes a polyimide, wherein the polyimide is derived from a composition including a dianhydride-based compound, and a compound represented by a Chemical Formula 1:

[Chemical Formula 1]

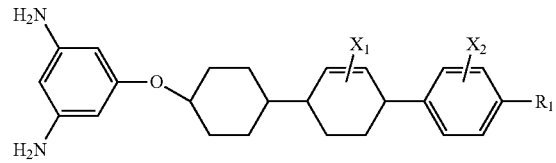

wherein, in the above Chemical Formula 1, $X_1$ and $X_2$ are independently F, Cl, or CN, and $R_1$ is a substituted or non-substituted $C_1$-$C_{12}$ alkyl group, a substituted or non-substituted $C_1$-$C_{12}$ alkoxy group, a substituted or non-substituted $C_1$-$C_{12}$ halogen-containing alkyl group, a substituted or non-substituted $C_1$-$C_{12}$ halogen-containing alkoxy group, or a combination thereof.

20 Claims, 16 Drawing Sheets

VERTICAL ALIGNMENT LAYER INCLUDING A POLYIMIDE AND LIQUID CRYSTAL DISPLAY INCLUDING THE SAME

CROSS REFERENCE TO RELATED APPLICATION

This application claims priority from and the benefit of Korean Patent Application No. 10-2009-0128208, filed on Dec. 21, 2009, which is hereby incorporated by reference for all purposes as if fully set forth herein.

BACKGROUND OF THE INVENTION

1. Field of the Invention

Exemplary embodiments of the present invention relate to a vertical alignment layer and a liquid crystal display including the same.

2. Discussion of the Background

Liquid crystal flat panel displays are widely used. A conventional liquid crystal display typically has two display panels on which field generating electrodes are formed, and a liquid crystal layer interposed between the panels. In the conventional liquid crystal display, voltages are applied to the field generating electrodes so as to generate an electric field in the liquid crystal layer, and the alignment of liquid crystal molecules of the liquid crystal layer is determined by the electric field. Accordingly, the polarization of incident light is controlled, thereby performing image display.

An alignment layer may be formed on the inner surfaces of the two display panels to align liquid crystal molecules of the liquid crystal layer. If no voltage is applied to the field generating electrodes, the liquid crystal molecules of the liquid crystal layer are aligned by way of the alignment layer. In contrast, if a voltage is applied to the field generating electrodes, the liquid crystal molecules of the liquid crystal layer are rotated in the direction of the electric field.

The above information disclosed in this Background section is only for enhancement of understanding of the background of the invention and it may contain information not included within the prior art.

SUMMARY OF THE INVENTION

Exemplary embodiments of the present invention provide a vertical alignment layer.

Exemplary embodiments of the present invention also provide a liquid crystal display including a vertical alignment layer.

Additional features of the invention will be set forth in the description which follows, and in part will be apparent from the description, or may be learned by practice of the invention.

An exemplary embodiment of the present invention discloses a vertical alignment layer comprising a polyimide, wherein the polyimide is derived from a composition including a dianhydride-based compound, and a compound represented by Chemical Formula 1:

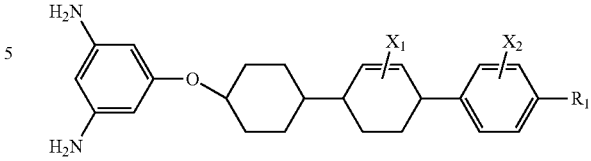

[Chemical Formula 1]

wherein $X_1$ and $X_2$ each independently include F, Cl, or CN, and wherein $R_1$ includes at least one of a substituted or non-substituted $C_1$-$C_{12}$ alkyl group, a substituted or non-substituted $C_1$-$C_{12}$ alkoxy group, a substituted or non-substituted $C_1$-$C_{12}$ halogen-containing alkyl group, and a substituted or non-substituted $C_1$-$C_{12}$ halogen-containing alkoxy group.

An exemplary embodiment of the present invention also discloses a liquid crystal display including a first substrate, a second substrate facing the first substrate, a liquid crystal layer disposed between the first substrate and the second substrate, and a vertical alignment layer disposed between the first substrate and the second substrate, wherein the vertical alignment layer includes a polyimide derived from a composition including a dianhydride-based compound, and a compound represented by Chemical Formula 1:

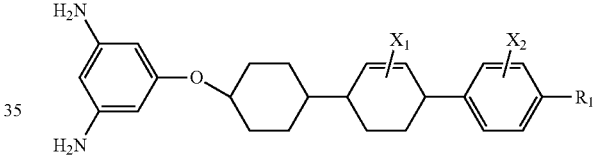

[Chemical Formula 1]

wherein $X_1$ and $X_2$ each independently include F, Cl, or CN, and wherein $R_1$ includes at least one of a substituted or non-substituted $C_1$-$C_{12}$ alkyl group, a substituted or non-substituted $C_1$-$C_{12}$ alkoxy group, a substituted or non-substituted $C_1$-$C_{12}$ halogen-containing alkyl group, and a substituted or non-substituted $C_1$-$C_{12}$ halogen-containing alkoxy group It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
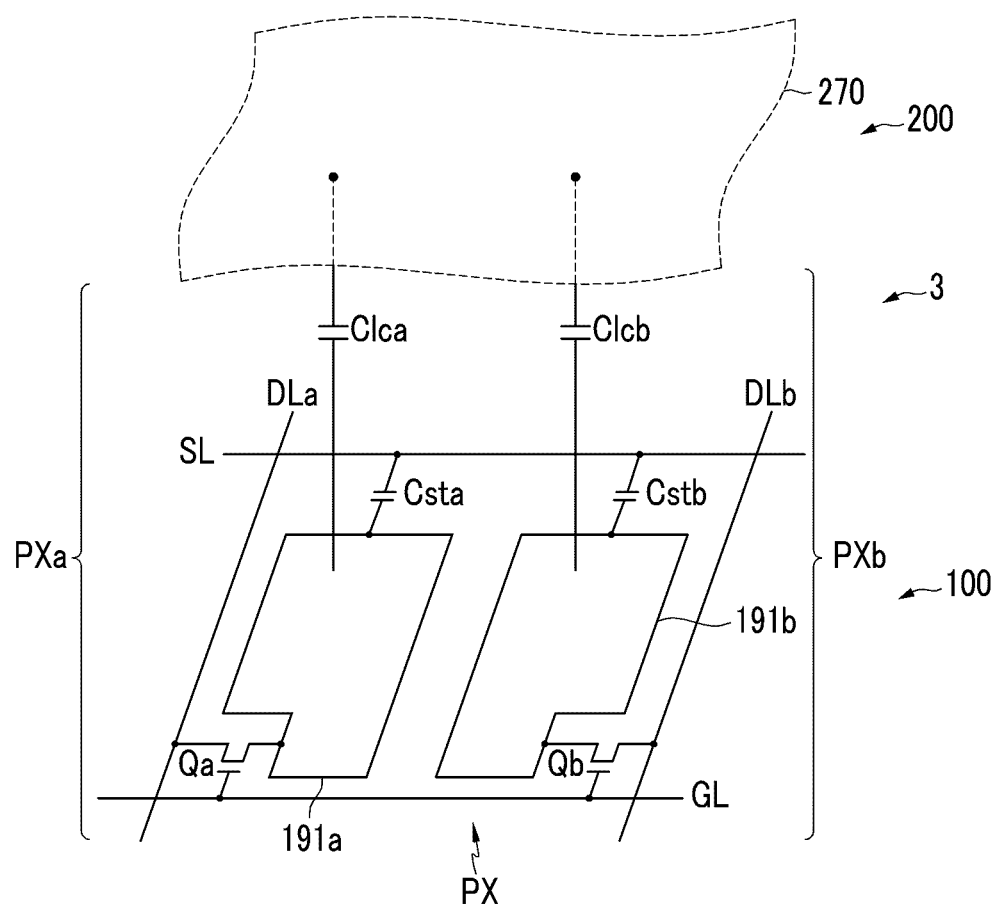
FIG. 1 is an equivalent circuit diagram of a pixel in a liquid crystal display according to an exemplary embodiment of the present invention.

The present invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those is skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

In the present specification, unless indicated to the contrary, "substituted" may refer to one substituted with at least a substituent selected from the group consisting of a halogen, a $C_1$-$C_{12}$ haloalkyl, a $C_1$-$C_{12}$ alkyl, a $C_1$-$C_{12}$ alkoxy, a $C_6$-$C_{12}$ aryl, or a $C_6$-$C_{12}$ aryloxy.

A liquid crystal display according to an exemplary embodiment of the present invention will be described.

A liquid crystal display includes two display panels, and an alignment layer to align liquid crystal molecules of the liquid crystal layer is disposed on the inner surface of at least one of the display panels. When a voltage is not applied to the field generating electrodes, the liquid crystal molecules are arranged in a direction by a vertical alignment layer. For example, a pre-tilt angle of the liquid crystal molecules by a vertical alignment layer may be in the range of about 80 degrees to about 95 degrees.

The vertical alignment layer includes a polyimide, and the polyimide is derived from a composition including a dianhydride-based compound and a compound represented by the following Chemical Formula 1.

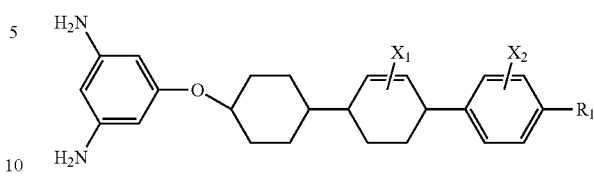

[Chemical Formula 1]

In the above Chemical Formula 1, X1 and X2 are independently F, Cl, or CN, and is RI is a substituted or non-substituted $C_1$-$C_{12}$ alkyl group, a substituted or non-substituted $C_1$-$C_{12}$ alkoxy group, a substituted or non-substituted $C_1$-$C_{12}$ halogen-containing alkyl group, a substituted or non-substituted $C_1$-$C_{12}$ halogen-containing alkoxy group, or a combination thereof.

The liquid crystal molecules may be aligned by the side chain derived from the compound represented by the above Chemical Formula 1. The compound represented by the above Chemical Formula 1 is connected with three cyclic hydrocarbons at the right side of an oxygen atom, and the length of the side chain is long such that the rigidity and straight linearity may be strong and the hydrophobicity of the compound represented by the above Chemical Formula 1 and the alignment stability of the liquid crystal molecule may be increased. For example, three cyclic hydrocarbons may have stronger rigidity, straighter linearity, and greater hydrophobicity than two cyclic hydrocarbons. Also, three cyclic hydrocarbons may be smaller than cholesterol, and may have strong rigidity and straight linearity. Further, the compound represented by the above Chemical Formula 1 has a similar structure to three cyclic liquid crystal molecules such that the alignment stability of the liquid crystal molecules may be increased. In addition, the hydrophobicity may be increased and the drip spot may be reduced by use of the compound represented by the above Chemical Formula 1.

The compound represented by the above Chemical Formula 1 may be from about 10 mol % to about 20 mol % of the entire composition. When it is more than about 10 mol %, the drip spot may be further reduced, and when it is less than about 20 mol %, the solubility of the alignment layer may be further increased.

The imidization ratio of the vertical alignment layer may be more than about 70%. For example, the imidization ratio of the composition in a solution state may be about 80%, and the imidization ratio after hardening of the composition may also be about 80%. When the imidization ratio of the vertical alignment layer is more than about 70%, the drip spot may be reduced and the reliability of the alignment layer may be improved. Furthermore, even when the imidization ratio of the vertical alignment layer is high, by the usage of the compound represented by the above Chemical Formula 1, the printing fault of the alignment layer may be reduced and the rework ratio of the alignment layer may be reduced.

The composition may include at least one dianhydride-based compound. For example, the dianhydride-based compound may be a compound represented by the following Chemical Formula 3 or a compound represented by the following Chemical Formula 4.

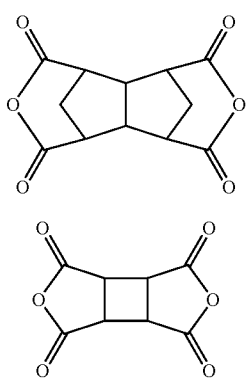

[Chemical Formula 3]

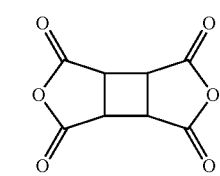

[Chemical Formula 4]

The compound represented by the above Chemical Formula 3 has a curved structure such that the surface area may be widened, and thereby, the solubility of the alignment layer may be increased and the printing fault of the alignment layer may be reduced.

The dianhydride-based compound may be from 40 mol % to 60 mol % of the entire composition. The content of the dianhydride-based compound may be related to the imidization ratio of the vertical alignment layer. For example, when the content of the dianhydride-based compound is more than about 40 mol % and less than about 60 mol %, the imidization ratio may be further increased and the reliability of the alignment layer may be further improved.

The composition may further include a compound represented by the following Chemical Formula 2.

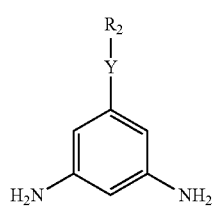

[Chemical Formula 2]

In the above Chemical Formula 2, Y is an oxygen atom, a carbonyl group, a carboxyl group, an amide group, a substituted or non-substituted $C_2$-$C_{12}$ alkylene group, or a substituted or non-substituted $C_2$-$C_{12}$ phenylene group, and R2 is a substituted or non-substituted $C_1$-$C_{12}$ alkyl group, a substituted or non-substituted $C_1$-$C_{12}$ alkoxy group, a substituted or non-substituted $C_1$-$C_{12}$ halogen-containing alkyl group, a substituted or non-substituted C1-C12 halogen-containing alkoxy group, or a combination thereof.

The compound represented by the above Chemical Formula 2 is substituted with a functional group having a polarity structure similar to a benzene ring. Accordingly, the solubility of the alignment layer may be increased, and printing fault may be reduced.

The compound represented by the above Chemical Formula 2 may be from about 25 mol % to about 45 mol % of the entire composition. When it is more than about 25 mol %, the solubility of the alignment layer may be further increased, and when it is less than about 45 mol %, the rigidity and straight linearity of the side chain of the alignment layer may be increased.

The composition may further include a solvent or a crosslinker. The solvent may be N-methylpyrrolidone, butyl cellosolve, gamma-butyro lactone, or a mixture thereof. For example, N-methylpyrrolidone and butyl cellosolve may be mixed in a ratio of about 4.5 to about 5.5, and in this case, the solubility of the alignment layer may be increased and the printing fault may be reduced.

Next, a liquid crystal display according to an exemplary embodiment of the present invention will be described with reference to FIG. 1, FIG. 2, FIG. 3, and FIG. 4.

Figure 2:
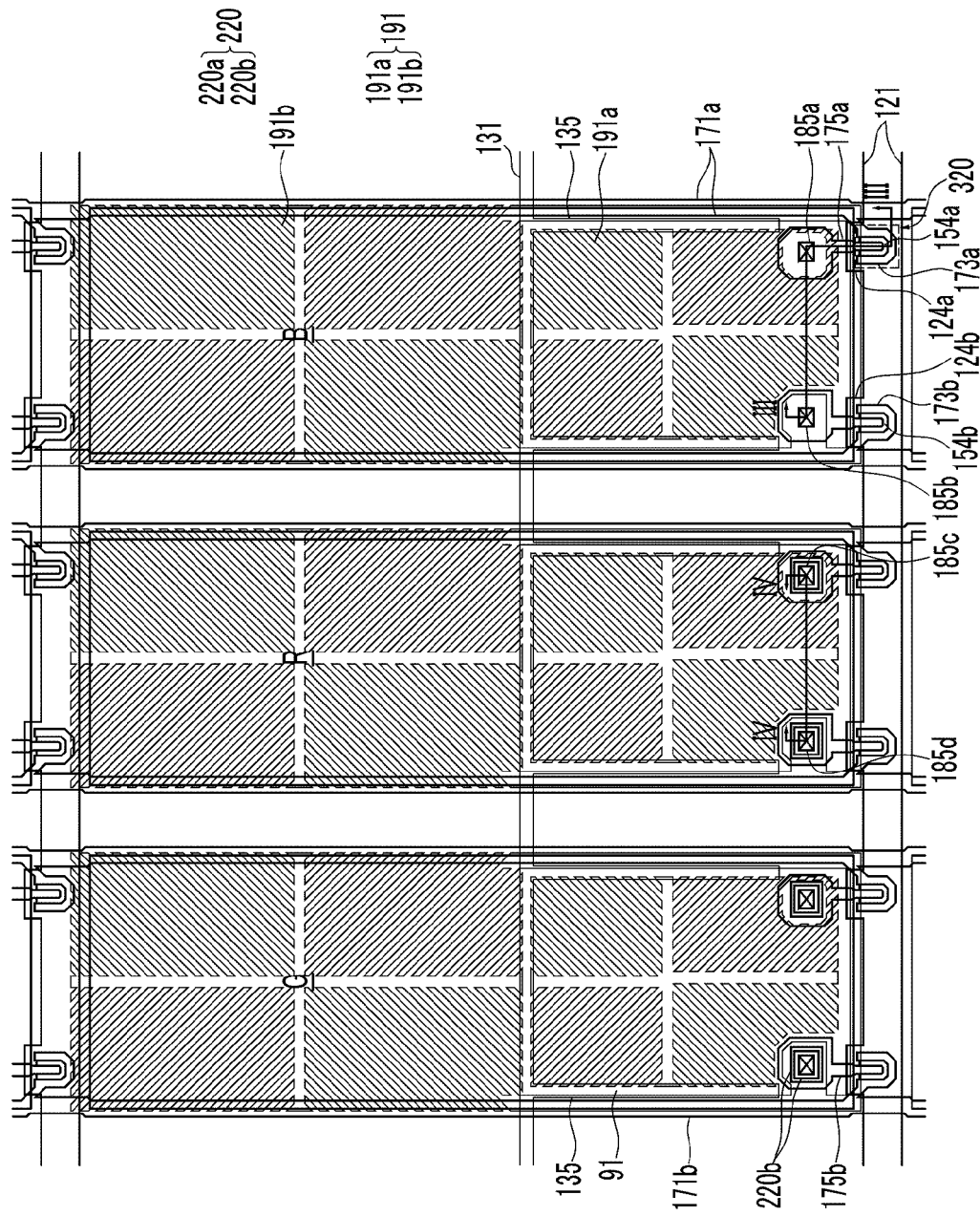
FIG. 2 is a layout view of a liquid crystal display according to an exemplary embodiment of the present invention.
Figure 3:
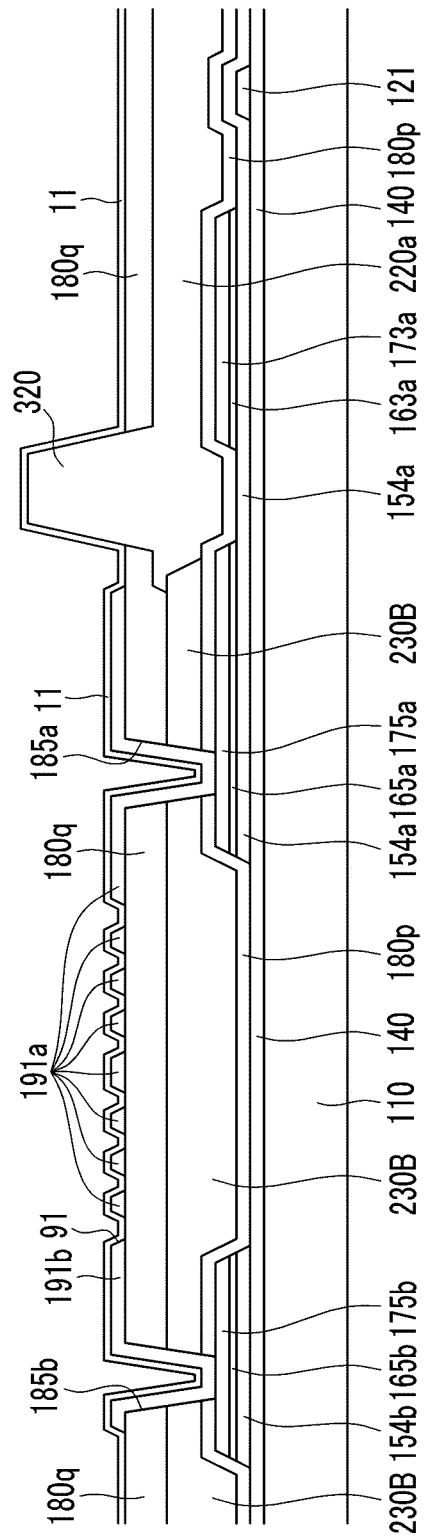
FIG. 3 is a cross-sectional view of the liquid crystal display shown in FIG. 2 taken along the line III-III.
Figure 4:
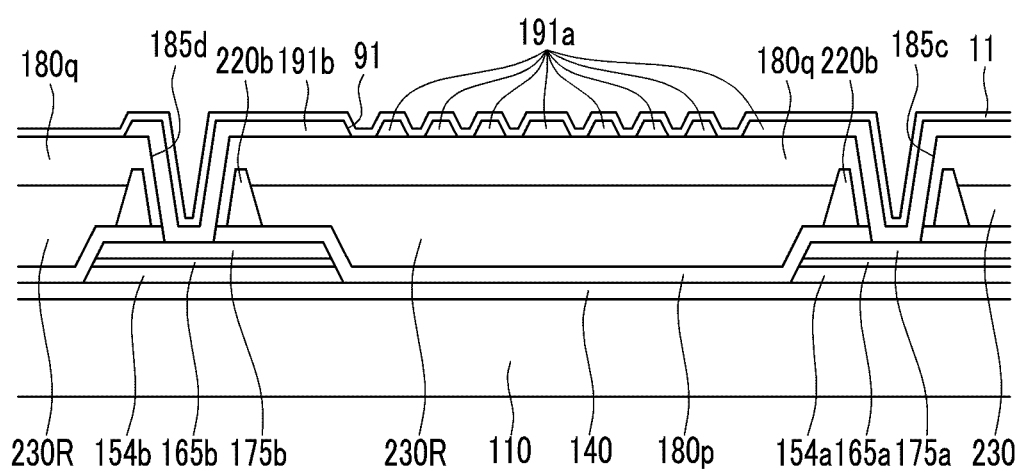
FIG. 4 is a cross-sectional view of the liquid crystal display shown in FIG. 2 taken along the line IV-IV.

FIG. 1 is an equivalent circuit diagram of a pixel in a liquid crystal display according to an exemplary embodiment of the present invention. FIG. 2 is a layout view of a liquid crystal display according to an exemplary embodiment of the present invention. FIG. 3 is a cross-sectional view of the liquid crystal display shown in FIG. 2 taken along the line III-III. FIG. 4 is a cross-sectional view of the liquid crystal display shown in FIG. 2 taken along the line IV-IV.

Referring to FIG. 1 and FIG. 2, a liquid crystal display according to an exemplary embodiment of the present invention includes a plurality of signal lines (including gate line 121, stem 131, first data line 171a, and second data line 171b), and pixels PX connected thereto.

Referring to FIG. 1, a liquid crystal display according to the present exemplary embodiment includes a first display panel 100 and a second display panel 200 facing each other, and a liquid crystal layer 3 interposed therebetween. The first display panel 100 includes signal lines including a plurality of gate lines GL, a plurality of pairs of data lines DLa and DLb, and a plurality of storage electrode lines SL with a plurality of pixels PX connected thereto.

Each pixel PX includes a pair of sub-pixels PXa and PXb. Each sub-pixel PXa and sub-pixel PXb includes, respectively, a first switching element Qa or a second switching element Qb, a first liquid crystal capacitor Clca or second liquid crystal capacitor Clcb, and a first storage capacitor Csta or second storage capacitor Cstb.

Each first switching element Qa and second switching element Qb is a three-terminal element such as a thin film transistor provided on the lower panel 100, and includes a control terminal connected to the gate line GL, an input terminal connected, respectively, to the data line DLa or the data line DLb, and an output terminal connected, respectively, to the first liquid crystal capacitor Clca or second liquid crystal capacitor Clcb and the first storage capacitor Csta or second storage capacitor Cstb.

Each first liquid crystal capacitor Clca and second liquid crystal capacitor Clcb uses a common electrode 270 and, respectively, a first sub-pixel electrode 191a or a second sub-pixel electrode 191b as two terminals. The liquid crystal layer 3 between the common electrode 270 and each of the first sub-pixel electrode 191a and the second sub-pixel electrode 191b functions as a dielectric material.

Each storage capacitor Csta and storage capacitor Cstb serves as an assistant to, respectively, the first liquid crystal capacitor Clca or the second liquid crystal capacitor Clcb and is formed as a storage electrode line SL provided on the panel 100 and, respectively, a first sub-pixel electrode 191a or a second sub-pixel electrode 191b with an insulator interposed is therebetween, and a with a voltage such as the common voltage Vcom applied thereto.

Referring to FIG. 1, FIG. 2, and FIG. 3, a plurality of gate lines 121 and a plurality of storage electrode lines (including stem 131 and storage electrode 135) are formed on an insulating substrate 110 made of glass or plastic. Each gate line 121 transmits a gate signal and extends substantially in a row direction. Each gate line 121 includes a plurality of first gate electrodes 124a and second gate electrodes 124b protruding from the gate line 121.

The storage electrode lines include a stem 131 extending substantially parallel to the gate lines 121, and a plurality of storage electrodes 135 extended from the stem 131. Here, the arrangement and shape of the stem 131 and the storage electrodes 135 may vary. In addition, the stem 131 and the storage electrodes 135 may be omitted.

A gate insulating layer 140 is formed on the gate lines 121 and the storage electrode lines (including the stem 131 and storage electrode 135). The gate insulating layer 140 may include silicon nitride (SiNx) or silicon oxide (SiOx).

A plurality of semiconductors, including first semiconductor 154a and second semiconductor 154b, preferably made of hydrogenated amorphous silicon (amorphous silicon is referred to as a-Si) or polysilicon, are formed on the gate insulating layer 140.

A plurality of pairs of ohmic contacts, including first ohmic contact 163a and second ohmic contact 163b, and first ohmic contact 165a and second ohmic contact 165b are formed on the first semiconductor 154a and the second semiconductor 154b, and the first ohmic contact 163a, second ohmic contact 163b, first ohmic contact 165a, and second ohmic contact 165b may be formed of a material such as n+hydrogenated amorphous silicon doped with an n-type impurity in a high concentration, or of a metal silicide.

A plurality of a pairs of data lines including first data line 171a and second data line 171b, and a plurality of drain electrodes including first drain electrode 175a and second drain electrode 175b are formed on the first ohmic contact 163a, the second ohmic contact 163b, the first ohmic contact 165a, and the second ohmic contact 165b, and on the gate insulating layer 140. Also, a storage voltage supplying line (not shown) is formed with the same layer as the first data line 171a and second data line 171b in a peripheral area. The storage voltage supplying line is formed substantially parallel to the first data line 171a and second data line 171b, and is electrically connected to the plurality stems 131 of the storage electrode lines.

The first data line 171a and second data line 171b extend substantially in the longitudinal direction thereby intersecting the gate lines 121 and the stems 131 of the storage electrode lines. Each first data line 171a and second data line 171b includes, respectively, a plurality of first source electrodes 173a or second source electrodes 173b extending toward, respectively, the first gate electrode 124a or second gate electrode 124b, and is curved into a "U" shape. The first source electrode 173a and second source electrode 173b are opposite, respectively, to the first drain electrode 175a and second drain electrode 175b with respect to the first gate electrode 124a and second gate electrode 124b.

A first gate electrode 124a, a first source electrode 173a, and a first drain electrode 175a form a thin film transistor (TFT) first switching element Qa along with a first semiconductor 154a. A second gate electrode 124b, a second source electrode 173b, and a second drain electrode 175b form a thin film transistor (TFT) second switching element Qb along with a second semiconductor 154b. The channel of the first switching element Qa is formed in the first semiconductor 154a between the first source electrode 173a and the first drain electrode 175a. The channel of the second switching element Qb is formed in the second semiconductor 154b between the second source electrode 173b and the second drain electrode 175b. The first drain electrode 175a and second drain electrode 175b are respectively connected to first sub-pixel electrode 191a and second sub-pixel electrode 191b of the liquid crystal display, thereby applying the driving voltage.

The first ohmic contact 165a is interposed between the underlying first semiconductor 154a and overlying drain electrode 175a thereby reducing the contact resistance therebetween. The first ohmic contact 163a is interposed between the underlying first semiconductor 154a and overlying first source electrode 173a thereby reducing the contact resistance therebetween. The second ohmic contact 165b is interposed between the underlying second semiconductor 154b and overlying second drain electrode 175b thereby reducing the contact resistance therebetween. The second ohmic contact 163b is interposed between the underlying second semiconductor 154b and overlying second source electrode 173b thereby reducing the contact resistance therebetween.

Three layers including the first semiconductor 154a, second semiconductor 154b, first ohmic contact 163a, second ohmic contact 163b, first ohmic contact 165a, second ohmic contact 165b, first data line 171a (including the first source electrode 173a and first drain electrode 1754), and second data line 171b (including the second source electrode 173b and the second drain electrode 175b) have substantially the same plane shape. The three layers may be formed by using one mask. However, the first semiconductor 154a and second semiconductor 154b and the first ohmic contact 163a, second ohmic contact 163b, first ohmic contact 165a, and second ohmic contact 165b may have an island shape. Also, the shape of the three layers may be varied.

A lower layer 180p including silicon nitride or silicon oxide is formed on the first data line 171a, second data line 171b, first drain electrode 175a, second drain electrode 175b, first semiconductor 154a, and second semiconductor 154b.

A blue color filter 230B, a green color filter, and a red color filter 230R are formed on the lower layer 180p. Each of the blue color filter 230B, green color filter, and red color filter 230R may have a belt shape. Also, each of the blue color filter 230B, green color filter, and red color filter 230R are printed by an Inkjet process such that the process property is good.

An upper layer 180q is formed on the blue color filter 230B, green color filter, and red color filter 230R. The upper layer 180q may include silicon oxide, silicon nitride, or a photosensitive organic material. The upper layer 180q planarizes the thin film transistor array panel.

Light blocking member 220a and light blocking member 220b are formed between the lower layer 180p and the upper layer 180q. The light blocking member 220a and light blocking member 220b extend substantially parallel to the first data line 171a and second s data line 171b, and include a protrusion covering the first switching element Qa and second switching element Qb. Light blocking members cover the blue color filter 230B, green color filter, and red color filter 230R, thereby preventing light leakage.

A spacer 320 made with the same layer as the light blocking member 220a is disposed on the lower layer 180p. The spacer 320 may be formed with a layer different from the light blocking member 220a. The spacer 320 maintains a gap of the liquid crystal layer 3, and may be a column spacer. The spacer 320 may be disposed between the first switching element Qa and second switching element Qb.

The light blocking member 220a and the spacer 320 may include the same material, and may be formed with different thicknesses by using a half-tone mask. Also, the arrangement and the shape of the spacer 320 may be varied.

A plurality of pixel electrodes 191 and a connecting member (not shown) are formed on the upper layer 180q. The plurality of pixel electrodes 191 and the connecting member may include the same material such as ITO or IZO, and may be formed with the same process.

Each pixel electrode 191 includes the first sub-pixel electrode 191a and second sub-pixel electrode 191b, the first sub-pixel electrode 191a and second sub-pixel electrode 191b being are separated from each other with a gap 91 therebetween.

The overall shape of the first sub-pixel electrode 191 and second sub-pixel electrodes 191b is a quadrangle. The area occupied by the second sub-pixel electrode 191b may be larger than the area occupied by the first sub-pixel electrode 191a in the whole pixel electrode 191. The first sub-pixel electrode 191a and second sub-pixel electrode 191b both include a first main branch and a second main branch, and a plurality of sub-branches extending from the first main branch and second main branch. The first main branch and second main branch is substantially parallel to the data line 171 and the gate line 121, respectively. The plurality of sub-branches are smaller branches of a comb-tooth pattern.

The first sub-pixel electrode 191a is physically and electrically connected to the first drain electrode 175a through a contact hole 185a or a contact hole 185c, and receives data voltages from the first drain electrode 175a.

The second sub-pixel electrode 191b is physically and electrically connected to the second drain electrode 175b through a contact hole 185b or a contact hole 185d, and receives data voltages from the second drain electrode 175b.

A lower alignment layer 11 is formed on the plurality of pixel electrodes 191 and the connecting member. The lower alignment layer 11 may be the above-described vertical alignment layer.

Next, a liquid crystal display according to an exemplary embodiment of the present invention will be described with reference to FIG. 5, FIG. 6, FIG. 7, and FIG. 8. Description cumulative of the above may be omitted.

Figure 5:
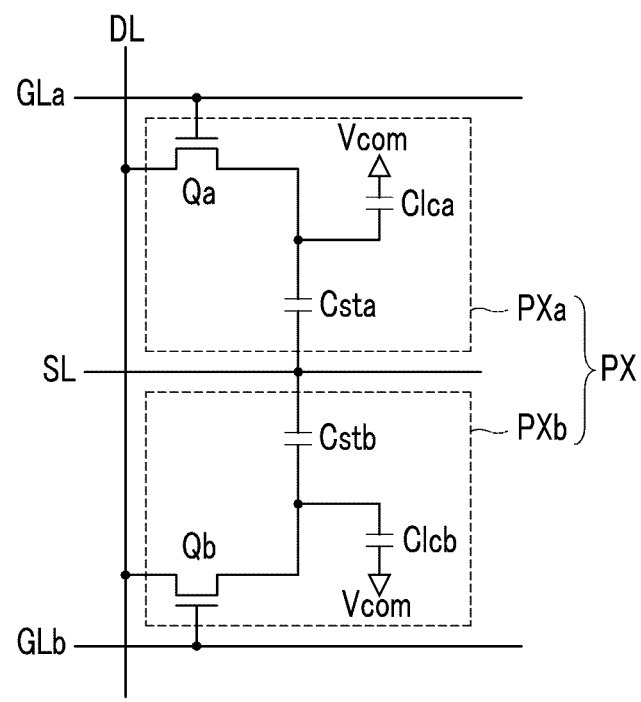
FIG. 5 is an equivalent circuit diagram of a pixel in a liquid crystal display according to an exemplary embodiment of the present invention.
Figure 6:
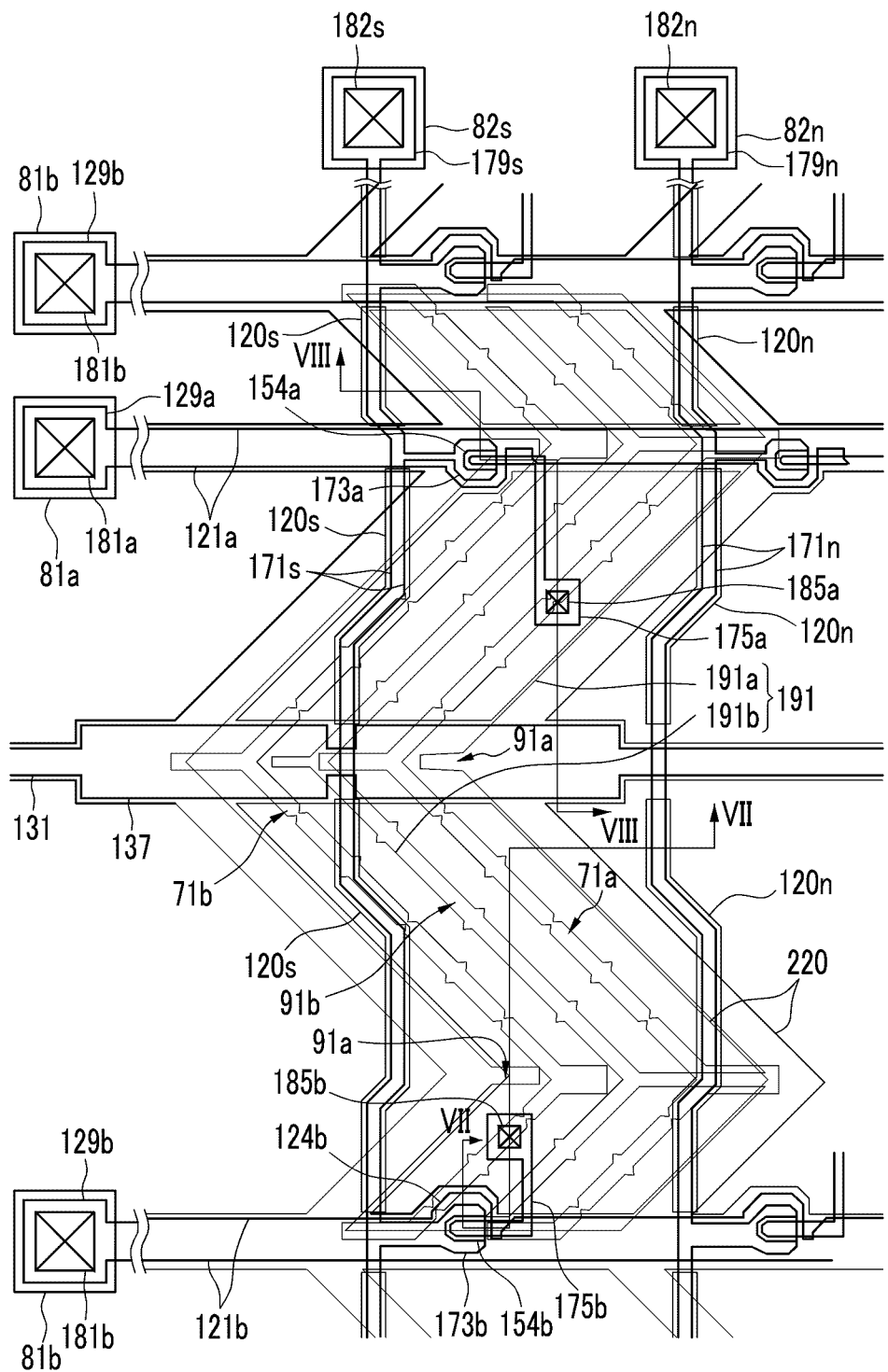
FIG. 6 is a layout view of a liquid crystal display according to an exemplary embodiment of the present invention.
Figure 7:
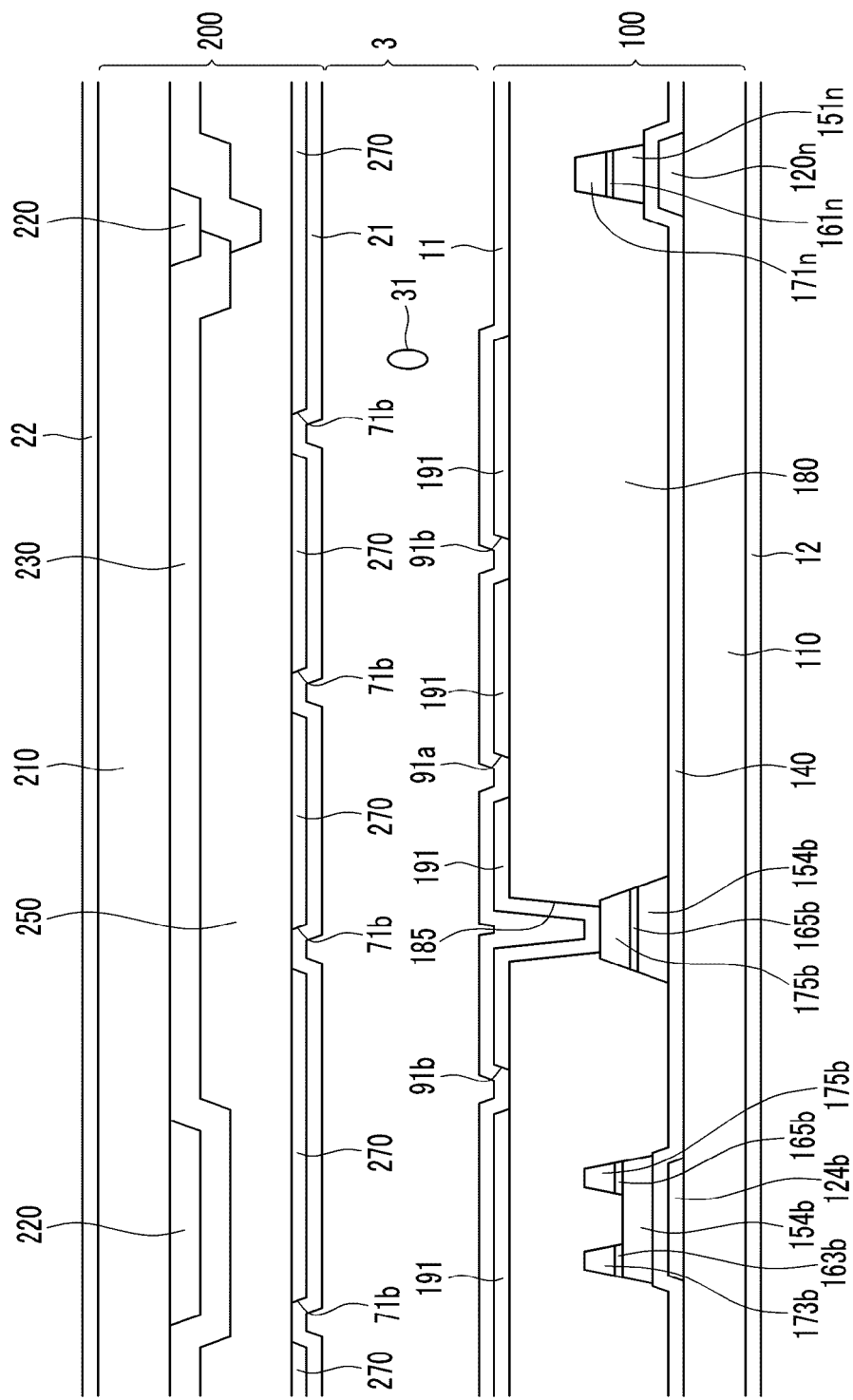
FIG. 7 is a cross-sectional view of the liquid crystal display shown in FIG. 6 taken along the line VII-VII.
Figure 8:
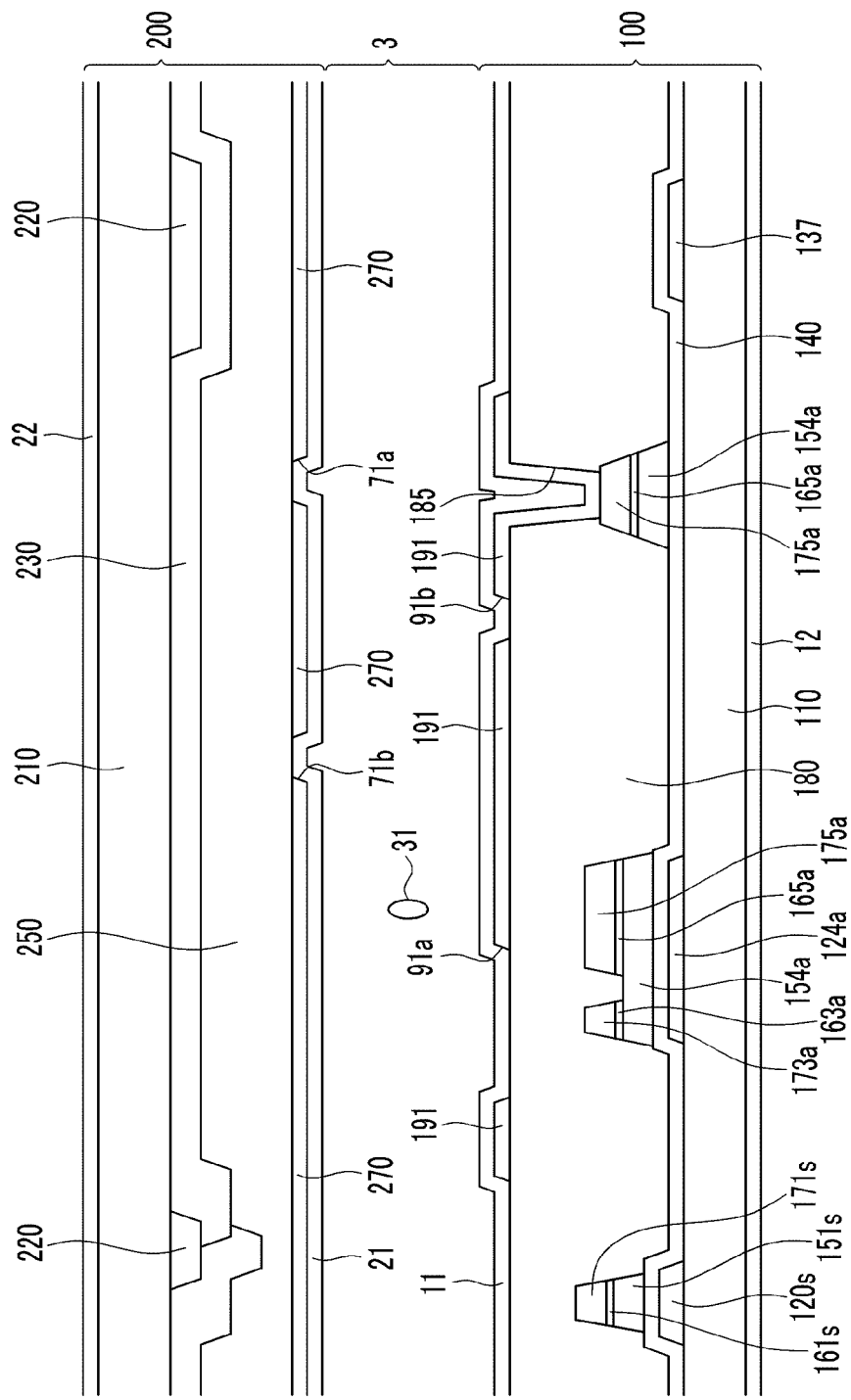
FIG. 8 is a cross-sectional view of the liquid crystal display shown in FIG. 6 taken along the line VIII-VIII.

FIG. 5 is an equivalent circuit diagram of a pixel in a liquid crystal display according to an exemplary embodiment of the present invention. FIG. 6 is a layout view of a liquid crystal display according to an exemplary embodiment of the present invention. FIG. 7 is a cross-sectional view of the liquid crystal display shown in FIG. 6 taken along the line VII-VII. FIG. 8 is a cross-sectional view of the liquid crystal display shown in FIG. 6 taken along the line VIII-VIII.

Referring to FIG. 5, gate line GLa and gate line GLb are respectively connected to first switching element Qa and second switching element Qb. First switching element Qa and second switching element Qb share one data line DL. The description of the pixel PX, first sub-pixel PXa, second sub-pixel PXb, first liquid crystal capacitor Clca, second liquid crystal capacitor Clcb, first storage capacitor Csta, second storage capacitor Cstb, and the storage electrode line SL is the same as the above description. The common voltage Vcom is a voltage that is supplied to a common electrode (not shown).

Referring to FIG. 6, FIG. 7, and FIG. 8, the first display panel 100 and the second display panel 200 facing each other and a liquid crystal layer 3 interposed between the first display panel 100 and second display panel 200 are included, and liquid crystal layer 3 includes liquid crystal materials 31.

A plurality of gate conductors including: a plurality of pairs of gate lines including first gate line 121a and second gate line 121b, a plurality of storage electrode lines 131, and a plurality of light blocking films including light blocking film 120s and light blocking film 120n are formed on an insulation substrate 110.

The first gate line 121a and second gate line 121b transfer the gate signals and extend substantially in the horizontal direction.

The first gate line 121a includes a plurality of first gate electrodes 124a protruding downward, and an end 129a. The second gate line 121b includes a plurality of second gate electrodes 124b protruding upward, and an end 129b.

The storage electrode line 131 extends substantially in the horizontal direction. The storage electrode line 131 is disposed between the first gate line 121a and the second gate line 121b, and is separated from the first gate line 121a and the second gate line 121b by the same distance. Each storage electrode line 131 includes a plurality of storage electrodes 137 expanded downwardly and upwardly. However, the shapes and arrangements of the storage electrodes 137 and the storage electrode lines 131 may vary.

The light blocking film 120s and light blocking film 120n extend substantially in the longitudinal direction and include a plurality of sub-blocking films that are separated from each other. The light blocking film 120n and light blocking film 120s are divided into a plurality of portions such that they do not make electrical contact with the first gate line 121a, second gate line 121b, and storage electrode line 131.

A gate insulating layer 140 is formed on the gate conductors (the gate conductors including light blocking film 120s, light blocking film 120n, first gate line 121a, second gate line 121b, and storage electrode line 131).

A plurality of semiconductor stripes 151s and semiconductor stripes 151n are formed on the gate insulating layer 140. The semiconductor stripe 151s and semiconductor stripe 151n extend substantially in the longitudinal direction and include a plurality of semiconductors including first semiconductor 154a and second semiconductor 154b protruding toward the first gate electrode 124a and second gate electrode 124b.

Ohmic contact stripe 161s is formed on the semiconductor stripe 151s, ohmic contact stripe 161n is formed on the semiconductor stripe 151n, first ohmic contact 165a is formed on the first semiconductor 154a, and second ohmic contact 165b is formed on the second semiconductor 154b. The ohmic contact stripe 161s and ohmic contact stripe 161n include a plurality of first ohmic contacts 163a and second ohmic contacts 163b, and the first ohmic contacts 163a and second ohmic contacts 163b and the first ohmic contacts 165a and second ohmic contacts 165b are disposed in pairs on the first semiconductor 154a and second semiconductor 154b of the semiconductor stripe 151s and semiconductor stripe 151n.

A data conductor including a plurality of data lines including data line 171s and data line 171n and a plurality of pairs of drain electrodes including first drain electrode 175a and second drain electrode 175b are formed on the ohmic contact stripe 161s, ohmic contact stripe 161n, first ohmic contact 165a, first ohmic contact 165b and the gate insulating layer 140.

The data lines 171s and data lines 171n transfer the data signals and extend substantially in the longitudinal direction thereby intersecting the first gate line 121a, second gate line 121b, and storage electrode line 131.

Each of data lines 171s and data lines 171n do not extend in a straight line but are bent at least twice. That is, the data line 171s and data line 171n include a plurality of straight portions perpendicular to the first gate line 121a and second gate line 121b and oblique portions inclined with the respect to the straight portions. The straight portions and the oblique portions are repeatedly connected to each other thereby forming a plurality of curved portions. The data line 171s and data line 171n overlap the light blocking film 120s and light blocking film 120n, and the light blocking film 120s and light blocking film 120n have curved portions according to the shape of the data line 171s and data line 171n and may have a wider width than the data line 171s and data line 171n.

Each of data line 171s and data line 171n includes a plurality of pairs of source electrodes including first source electrode 173a and second source electrode 173b extending toward the first gate electrode 124a and second gate electrode 124b.

The first drain electrode 175a and second drain electrode 175b face the first source electrode 173a and second source electrode 173b, respectively, and the ends of the first drain electrode 175a and second drain electrode 175b curve in the direction of the first source electrode 173a and second source electrode 173b, respectively.

The first gate electrode 124a, the first source electrode 173a, and the first drain electrode 175a form the first thin film transistor Qa along with the first semiconductor 154a, and the channel of the first thin film transistor Qa is formed in the first semiconductor 154a between the first source electrode 173a and the first drain electrode 175a.

The second gate electrode 124b, the second source electrode 173b, and the second drain electrode 175b form the second thin film transistor Qb along with the second semiconductor 154b, and the channel of the second thin film transistor Qb is formed in the second semiconductor 154b between the second source electrode 173b and the second drain electrode 175b.

The ohmic contact stripe 161s is interposed between the underlying semiconductor stripe 151s and the overlying data line 171s, thereby reducing contact resistance therebetween. The ohmic contact stripe 161n is interposed between the underlying semiconductor stripe 151n and the overlying data line 171n, thereby reducing contact resistance therebetween. The first ohmic contact 165a is interposed between the underlying first semiconductor 154a and the overlying first drain electrode 175a, thereby reducing contact resistance therebetween. The second ohmic contact 165b is interposed between the underlying second semiconductor 154b and the overlying second drain electrode 175b, thereby reducing contact resistance therebetween. The first semiconductor 154a and second semiconductor 154b include portions that are not covered by the data line 171s, data line 171n, first drain electrode 175a, and second drain electrode 175b and portions between the first source electrode 173a and first drain electrode 175a, and between the second source electrode 173b and second drain electrode 175b.

Each of the semiconductor stripe 151s, semiconductor stripe 151n, data line 171s, data line 171n, first drain electrode 175a, and second drain electrode 175b, and their respective underlying ohmic contact stripe 161s, ohmic contact stripe 161n, first ohmic contact 165a, and second ohmic contact 165b have substantially the same plane shape.

A passivation layer 180 is formed on the data line 171s, data line 171n, first drain electrode 175a, and second drain electrode 175b and on exposed portions of the first semiconductor 154a and second semiconductor 154b. The passivation layer 180 has a plurality of contact holes including contact hole 182s, contact hole 182n, contact hole 185a, and contact hole 185b. Contact hole 182s and contact hole 182n respectively expose the end 179s and end 179n of the data line 171s and data line 171n Contact hole 185a and contact hole 185b respectively expose the end of the first drain electrode 175a and second drain electrode 175b. The passivation layer 180 and the gate insulating layer 140 have a contact hole 181a and contact hole 181b respectively exposing the end 129a and end 129b of the first gate line 121a and second gate line 121b.

A plurality of pixel electrodes 191 and a plurality of contact assistants including contact assistant 81a, contact assistant 81b, contact assistant 82s, and contact assistant 82n are formed on the passivation layer 180.

Each pixel electrode 191 includes a first sub-pixel electrode 191a and a second sub-pixel electrode 191b separated from each other. The first sub-pixel electrode 191a and the second sub-pixel electrode 191b are adjacent to each other in the row direction, and include, respectively, cutout 91a and cutout 91b. The common electrode 270 includes cutout 71a and cutout 71b facing both the first sub-pixel electrode 191a and second sub-pixel electrode 191b.

The first sub-pixel electrode 191a is connected to the first drain electrode 175a through the contact hole 185a, and the second sub-pixel electrode 191b is connected to the second drain electrode 175b through the contact hole 185b.

The pixel electrode 191 overlaps the data line 171s and data line 171n via the passivation layer 180. Each data line 171s and data line 171n overlaps with its adjacent pixel electrodes 191. Data line 171s and data line 171n overlap not only with a pixel electrode 191 that is connected through the first switching element Qa and second switching element Qb, but also with a pixel electrode 191 adjacent to the pixel electrode 191 because of the bent shape of the pixel electrode 191.

A light blocking member 220 is formed on an insulation substrate 210. The light blocking member 220 includes a linear portion corresponding to the first gate line 121a and second gate line 121b and a sheet portion corresponding to the thin film transistors. The light blocking member 220 may correspond to the gap between the pixel electrode 191 and an adjacent pixel electrode 191.

A plurality of color filters 230 are formed on the insulation substrate 210 and the light blocking member 220. The color filters 230 are mainly disposed in the regions enclosed by the light blocking member 220, and may extend according to the column of the pixel electrodes 191.

An overcoat 250 is formed on the color filter 230 and the light blocking member 220. The overcoat 250 may be made of an insulator, such as, for example, an organic insulator. The overcoat 250 prevents the color filter 230 from being exposed and provides a planarized surface. The overcoat 250 may be omitted.

A common electrode 270 is formed on the overcoat 250. The common electrode 270 includes a plurality of cutouts including cutout 71a and cutout 71b.

Alignment layer 11 is formed on the inner surface of the first display panel 100 and alignment layer 21 is formed on the inner surface of the second display panel 200. The alignment layer 11 and alignment layer 21 may be the above-described vertical alignment layers.

Next, a liquid crystal display according to an exemplary embodiment of the present invention will be described with reference to FIG. 9 and FIG. 10. The equivalent circuit diagram of FIG. 8 may apply to the liquid crystal display of FIG. 9. Description cumulative of the above may be omitted.

Figure 9:
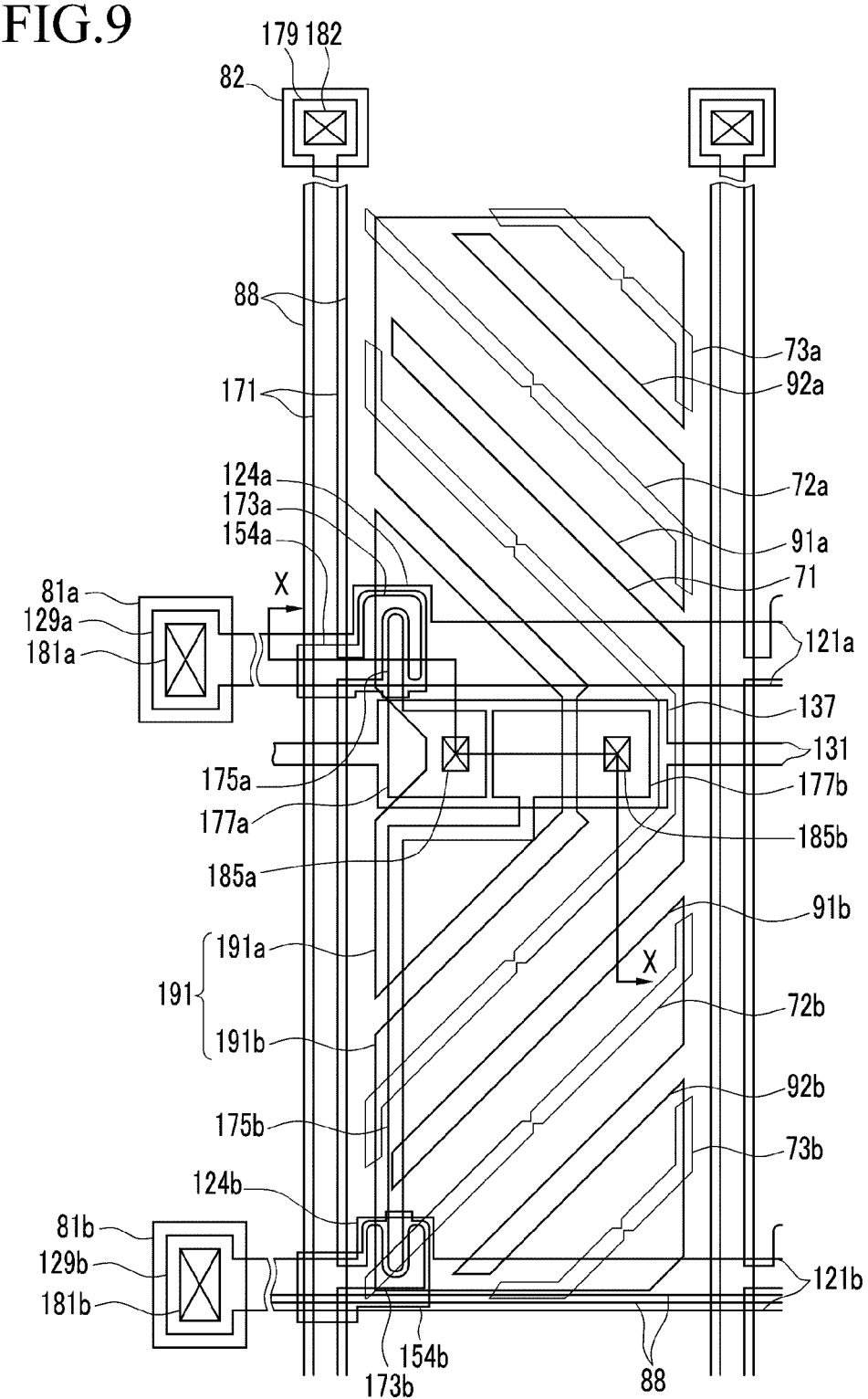
FIG. 9 is a layout view of a liquid crystal display according to an exemplary embodiment of the present invention.
Figure 10:
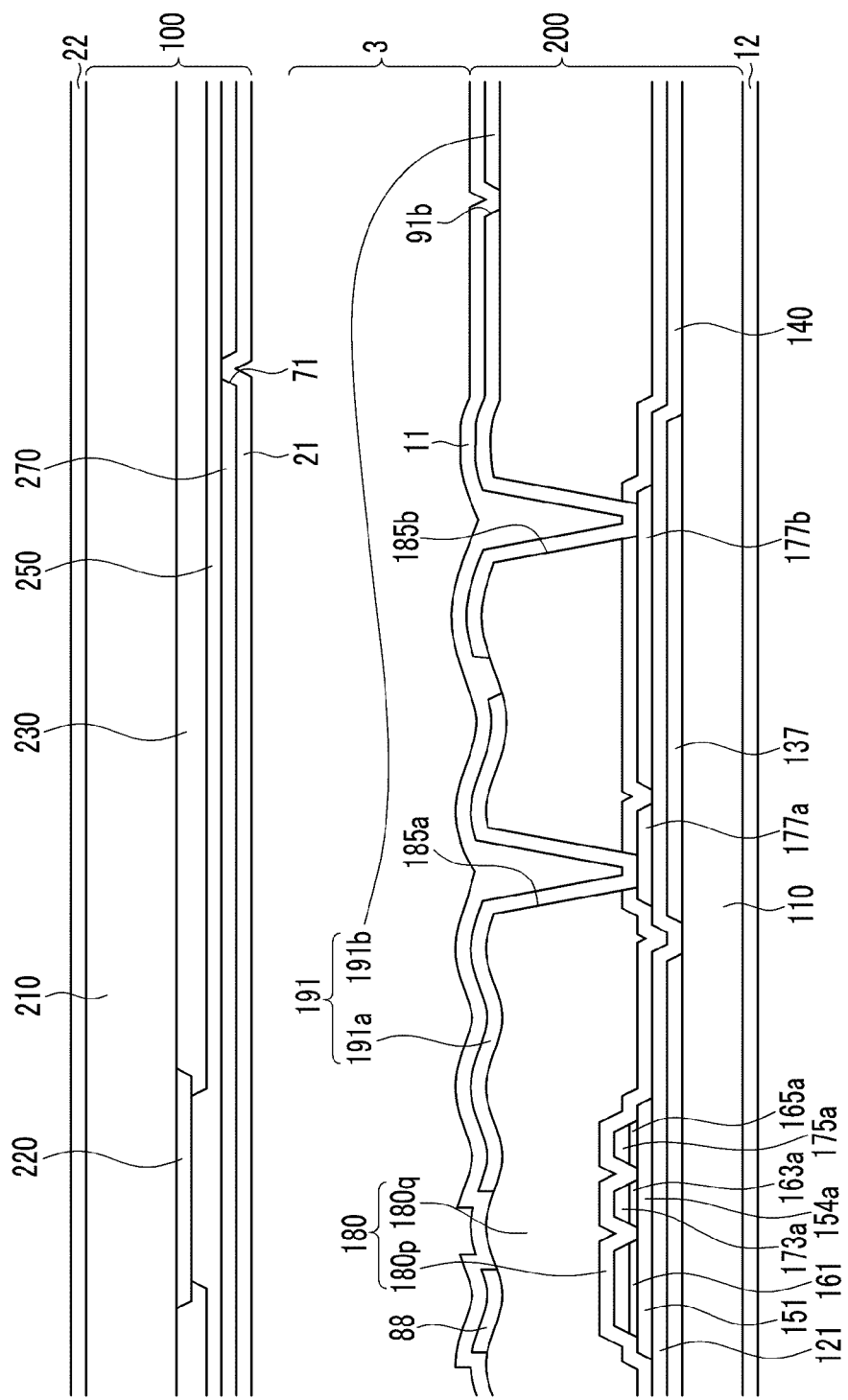
FIG. 10 is a cross-sectional view of the liquid crystal display shown in FIG. 9 taken along the line X-X.

FIG. 9 is a layout view of a liquid crystal display according to an exemplary embodiment of the present invention, and FIG. 10 is a cross-sectional view of the liquid crystal display shown in FIG. 9 taken along the line X-X.

The first gate line 121a and second gate line 121b include, respectively, the first is gate electrode 124a and second gate electrode 124b, and extend substantially in the column direction. The data lines 171 include the first source electrode 173a and second source electrode 173b. The first gate line 121a and second gate line 121b and the data lines 171 may include at least one of end 29a, end 129b, and end 179. A semiconductor layer 151, including first semiconductor 154a and second semiconductor 154b and an ohmic contact layer 161, including first ohmic contact 163a and first ohmic contact 165a may be disposed between the gate lines, including first gate line 121a and second gate line 121b and the data lines 171. A passivation layer 180 is disposed on the data lines 171. A passivation layer 180 may include an upper passivation layer 180q, a lower passivation layer 180p, or both, and may include an inorganic insulating material, an organic insulating material, or a mixture thereof. A passivation layer 180 may expose an extended portion 177a and an extended portion 177b of, respectively, drain electrode 175a and drain electrode 175b through, respectively, contact hole 185a and contact hole 185b, and may expose the end 129a, end 129b, and end 179 through, respectively, contact hole 181a, contact hole 181b, and contact hole 182. A pixel electrode 191, a shielding electrode 88, contact assistant 81, and contact assistant 82 are disposed on the passivation layer 180, and may independently include a transparent conductive material such as ITO or 120, or a reflective material such as aluminium, silver, chrome, or alloy thereof.

The first switching element Qa includes the first drain electrode 175a and extended portion 177a connected to the first sub-pixel electrode 191a, the first gate electrode 124a, and the first source electrode 173a. The second switching element Qb includes the second drain electrode 175b and extended portion 177b connected to the second sub-pixel electrode 191b, the second gate electrode 124b, and the second source electrode 173b.

The first sub-pixel electrode 191a includes a longitudinal edge parallel to the data line 171, and a pair of edges forming an oblique angle with respect to the gate line 121.

The second sub-pixel electrode 191b is adjacent to the first sub-pixel electrode 191a in a row direction. The second sub-pixel electrode 191b has four major edges substantially parallel to the gate line 121 or the data line 171. The right edge of the second sub-pixel electrode 191b is chamfered. The chamfered oblique side of the second sub-pixel electrode 191b is inclined with respect to the gate line 121 by an angle of about 45°. The left edge of the second sub-pixel electrode 191b includes a cutout portion to accommodate the shape of the first sub-pixel electrode 191a.

The second sub-pixel electrode 191b has cutouts including a first upper cutout 91a, a first lower cutout 91b, a second upper cutout 92a, and a second lower cutout 92b, and is partitioned into a plurality of regions by the cutouts. The cutouts are symmetrically opposite with respect to the storage electrode line 131, which bisects the pixel electrode 191.

The cutouts slant and extend from the left side of the pixel electrode 191 to the right side of the pixel electrode 191, and are located above and below the storage electrode line 131. The second upper cutout 92a and second lower cutout 92b are inclined with respect to the gate line 121 by an angle of about 45°.

The lower portion of the second sub-pixel electrode 191b is partitioned in three regions by the first lower cutout 91b and second lower cutout 92b, and the upper portion of the second sub-pixel electrode 191b is partitioned in three regions by the first upper cutout 91a and second upper cutout 92a. The number of partitioned regions or the number of cutouts may depend on design factors, such as the size of the pixel electrode 191, a length ratio of the horizontal side and the vertical side of the pixel electrode 191, or the type or characteristics of the liquid crystal layer 3.

The common electrode 270 has a plurality of cutouts. The cutouts each face one pixel electrode 191, and include a first cutout 71, a first upper cutout 72a, a first lower cutout 72b, a second upper cutout 73a, and a second lower cutout 73b. Each of the cutouts including first cutout 71, first upper cutout 72a, first lower cutout 72b, second upper cutout 73a, and second lower cutout 73b is disposed between adjacent cutouts including first upper cutout 91a, first lower cutout 91b, second upper cutout 92a, and second lower cutout 92b of the pixel electrode 191, or between the first sub-pixel electrode 191a and second sub-pixel electrode 191b. Each of the cutouts including first cutout 71, first upper cutout 72a, first lower cutout 72b, second upper cutout 73a, and second lower cutout 73b has at least one slanting portion extending substantially in parallel to the cutouts including first upper cutout 91a, first lower cutout 91b, second upper cutout 92a, and second lower cutout 92b of the pixel electrode 191. Each slanting portion has at least one scooped notch. The cutouts including first cutout 71, first upper cutout 72a, first lower cutout 72b, second upper cutout 73a, and second lower cutout 73b are symmetrically opposite with respect to the storage electrode line 131.

Alignment layer 11 is formed on the inside of the first display panel 100, and alignment layer 21 is formed on inside of the second display panel 200. The alignment layer 11 and alignment layer 21 may be the above-described vertical alignment layers.

Polarizer 12 and polarizer 22 may be disposed on the outside of the first display panel 100 and the second display panel 200, respectively.

Next, the present invention will be described through exemplary embodiments in detail, however the exemplary embodiments are only exemplary of the present invention, and the present invention is not limited by the exemplary embodiments below.

Exemplary Embodiment 1

A compound at 37.5 mol % represented by the above Chemical Formula 3, a compound at 12.5 mol % represented by the above Chemical Formula 4, a compound at 15 mol % represented by the following Chemical Formula 5, and a compound at 35 mol % represented by the following Chemical Formula 6 are mixed to form a polyimide.

[Chemical Formula 5]

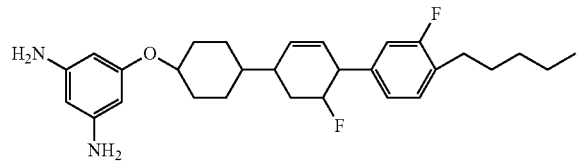

[Chemical Formula 6]

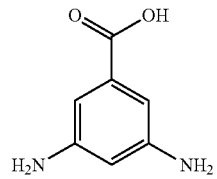

The concentration of the solid content of the compound represented by the above-described mixture of Chemical Formula 3, Chemical Formula 4, Chemical Formula 5, and Chemical Formula 6 is 6.4%. As the solvent, N-methylpyrrolidone and butyl cellosolve are mixed and used in a ratio of 46.6:53.4. The imidization ratio of the solution state is 82%, and the imidization ratio after baking at a thermo-compression temperature of 200° C. is 82%. The viscosity is 19.6 cP, the number-average molecular weight is 22,000, and the weight-average molecular weight is 58,000.

COMPARATIVE EXAMPLE 1

A compound at 50 mol % represented by the following Chemical Formula 9, a compound at 35 mol % represented by the above Chemical Formula 6, a compound at 5 mol % represented by the following Chemical Formula 7, a compound at 10 mol % represented by the following Chemical Formula 8, and an epoxy compound at 4 mol % are mixed to form a polyimide.

[Chemical Formula 7]

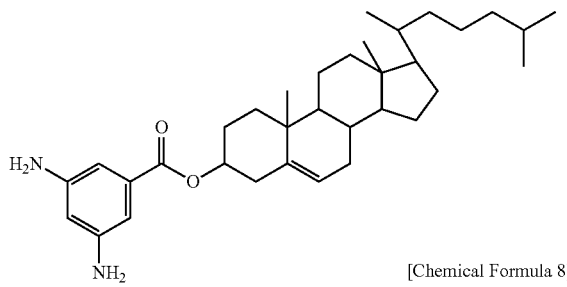

[Chemical Formula 8]

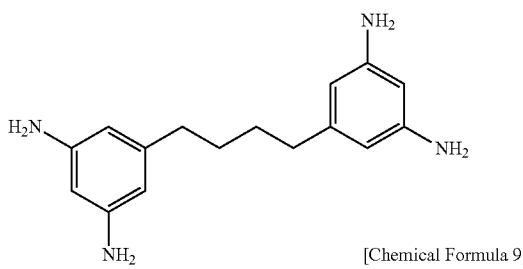

[Chemical Formula 9]

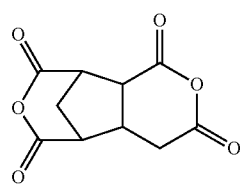

The concentration of the solid content of the compound represented by the above-described mixture of Chemical Formula 6, Chemical Formula 7, Chemical Formula 8, and Chemical Formula 9 and the epoxy compound is 6.5%. As the solvent, N-methylpyrrolidone, butyl cellosolve, and gamma-butyro lactone are mixed and used in a ratio of 30:30:40. The imidization ratio of the solution state is 75%, and the imidization ratio after baking at a thermo-compression temperature of 200° C. is 85%. The viscosity is 23 cP, the number-average molecular weight is 14,800, and the weight-average molecular weight is 80,000.

Light Characteristic Measuring

The alignment layer of the liquid crystal display is formed by using polyimides manufactured in Exemplary Embodiment 1 and Comparative Example 1, and the light characteristic is measured and represented in Table 1 below.

TABLE 1

| | Black luminance (cd) | White luminance (cd) | Contrast ratio | Rising time (ms) | Falling time (ms) | Rising & falling time (ms) |
|---|---|---|---|---|---|---|
| Exemplary Embodiment 1 | 0.10 | 523.17 | 4996.18 | 12.98 | 9.58 | 22.56 |
| Comparative Example 1 | 0.11 | 524.30 | 4715.30 | 11.72 | 10.62 | 22.33 |

The light characteristics of Exemplary Embodiment 1 and Comparative Example 1 are similar.

Pre-Tilt Measuring

The alignment layer of the liquid crystal display is formed by using polyimides manufactured in Exemplary Embodiment 1 and Comparative Example 1, and is rubbed to measure the pre-tilt angle. A roller speed of the rubbing is 1000 rpm, a stage speed is 50 mm/s, and a pile contact length is 0.2 mm.

The pre-tilt angle of Exemplary Embodiment 1 is 87.5, and the pre-tilt angle of Comparative Example 1 is 84.8. Accordingly, the pre-tilt angle is large after rubbing in Exemplary Embodiment 1 such that the vertical alignment force of Exemplary Embodiment 1 is good. Therefore, the drip spot related to a white spot stain may be reduced.

Voltage Holding Rate (VHR) Measuring

Figure 11:
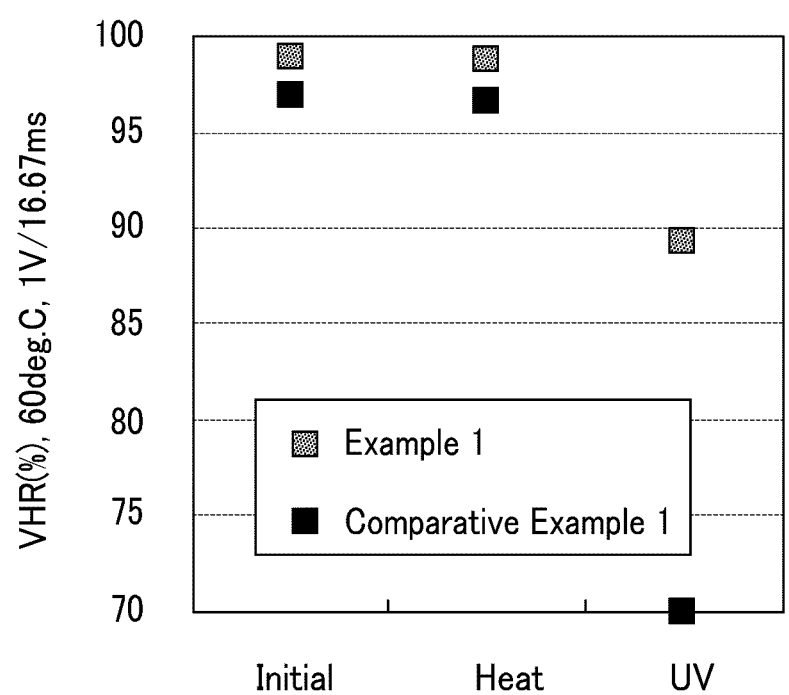
FIG. 11 a graph measuring Voltage Holding Rate (VHR).

The alignment layer of the liquid crystal display is formed by using the polyimides manufactured in Exemplary Embodiment 1 and Comparative Example 1, and the VHR is measured and represented in FIG. 11.

It may be confirmed that the VHR of Exemplary Embodiment 1 is high when subjected to heat or incident ultraviolet (UV) light. Accordingly, the drip spot related to a black spot stain may be reduced, and the reliability of the alignment layer may be increased.

Ion Density Measuring

Figure 12:
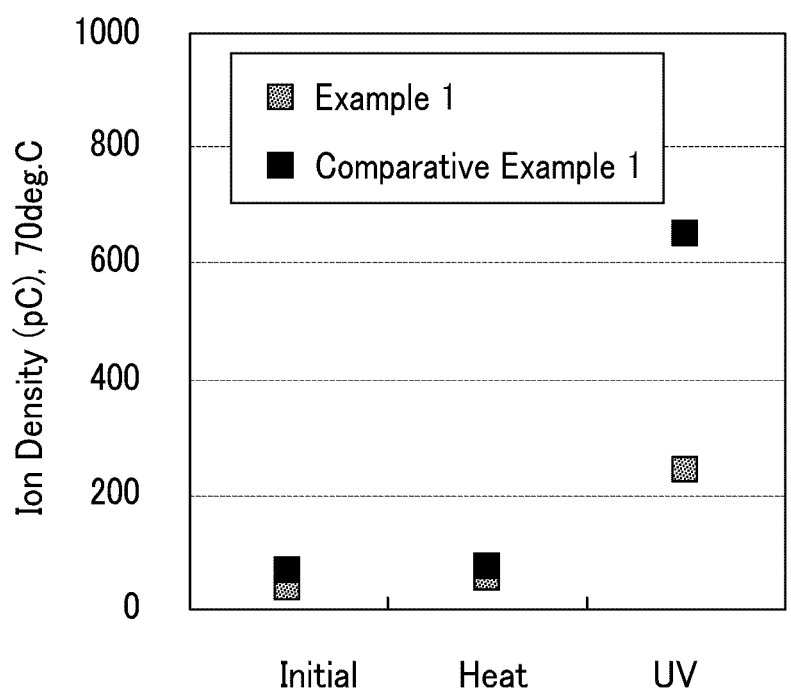
FIG. 12 is a graph measuring ion density.

The alignment layer of the liquid crystal display is formed by using the polyimides manufactured in Exemplary Embodiment 1 and Comparative Example 1, and the amount of ion impurities included in the liquid crystal layer is measured and represented in FIG. 12.

It may be confirmed that the ion density of Exemplary Embodiment 1 is low when subjected to heat or incident UV light. Accordingly, the drip spot related to a black spot stain may be reduced, and the reliability of the alignment layer may be increased.

Remaining Direct Current (DC) Measuring

The alignment layer of the liquid crystal display is formed by using the polyimides manufactured in Exemplary Embodiment 1 and Comparative Example 1, and the remaining DC is measured and is shown in Table 2 below. A flicker free method is used for the measuring. A DC offset voltage of 1 V is applied under the driving conditions of 5.8 V AC for 24 hours and 72 hours, and the remaining DC is respectively measured.

The remaining DC refers to a situation wherein when the DC voltage is applied to the liquid crystal display, the ion impurity is accumulated to one electrode by polarization of the ion impurity, and although a voltage is not applied, it appears as if an electric field is formed to the electrode.

TABLE 2

| Remaining DC (V) Remaining DC (V) | Exemplary Embodiment 1 | | Comparative Example 1 | |
|---|---|---|---|---|
| | 24 hours | 72 hours | 24 hours | 72 hours |
| Initial | 0.03 | 0.11 | 0.15 | 0.21 |
| Heat | 0.10 | 0.22 | 0.51 | 0.61 |
| Heat + UV | 0.31 | 0.52 | 0.79 | 0.81 |

It may be confirmed that the remaining DC of Exemplary Embodiment 1 is low when subjected to heat or incident UV light. Accordingly, the drip spot related to the black spot stain may be reduced, and the reliability of the alignment layer may be increased.

High Temperature and High Humidity Measuring

Figure 13A:
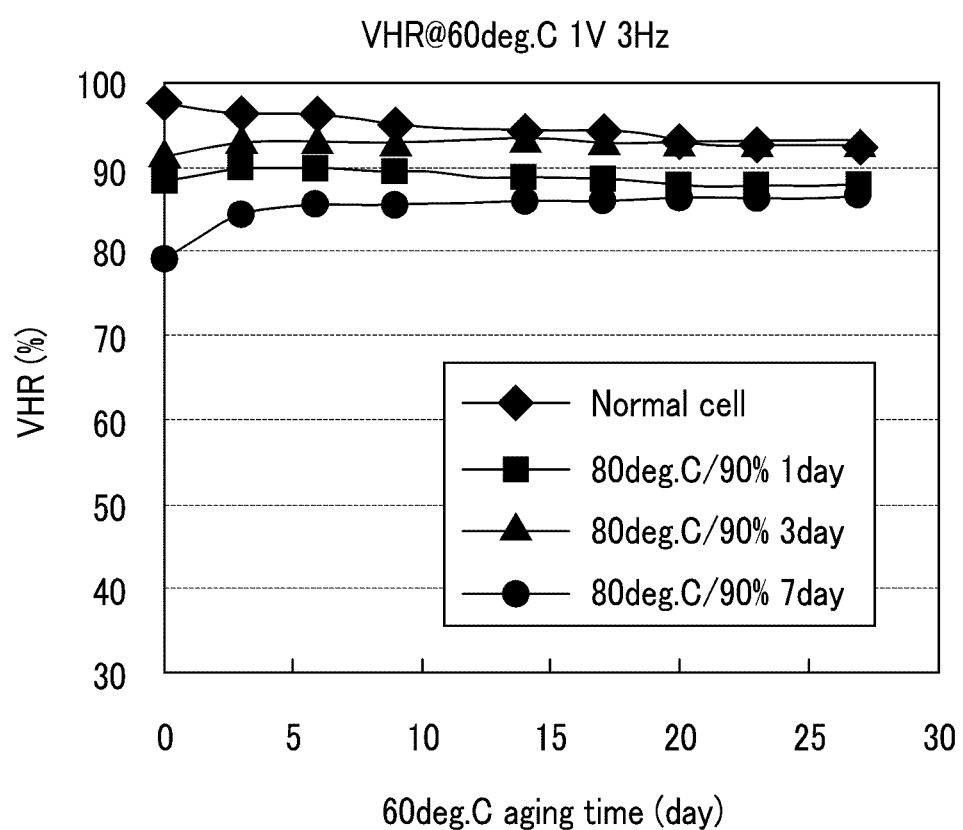
FIG. 13A and FIG. 13B are a graphs measuring a change of VHR.
Figure 13B:
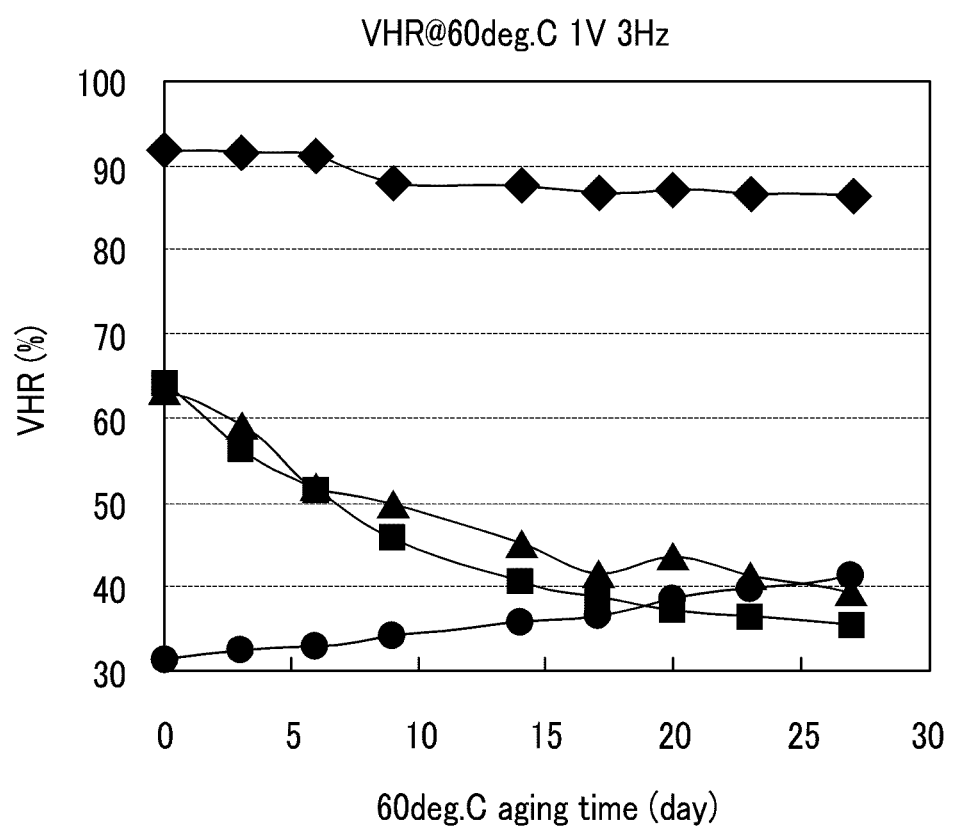

The alignment layer of the liquid crystal display is formed by using the polyimides manufactured in Exemplary Embodiment 1 and Comparative Example 1, and the change of the VHR is measured under high temperature and high humidity. Results of these measurements are represented in FIG. 13A and FIG. 13B. FIG. 13A is a graph representing results related to Exemplary Embodiment 1, and FIG. 13B is a graph representing results related to Comparative Example 1.

The liquid crystal display is subjected to a temperature of 80° C. and a relative humidity of 90% for 1 day, 3 days, and 7 days. Next, the change of the VHR is measured at 60° C.

It may be confirmed that the VHR of Exemplary Embodiment 1 is large. Accordingly, the reliability of the alignment layer may be increased.

Afterimage Measuring

The alignment layer of the liquid crystal display is formed by using the polyimides manufactured in Exemplary Embodiment 1 and Comparative Example 1, and the liquid crystal display is operated while subject to a high temperature for a long time to measure the afterimage. The results of this test are represented in Table 3 below.

TABLE 3

|  | Exemplary Embodiment 1 | Comparative Example 1 |
| --- | --- | --- |
| 50° C., 12 hours, stopping image | Good | Good |
| 50° C., 3000 hours | Good | Line afterimage generation |
| 70° C., 3000 hours | Good | Line afterimage generation |

It may be confirmed that alignment layer of Exemplary embodiment 1 reduces afterimage generation.

Printing Faults

Figure 14A:
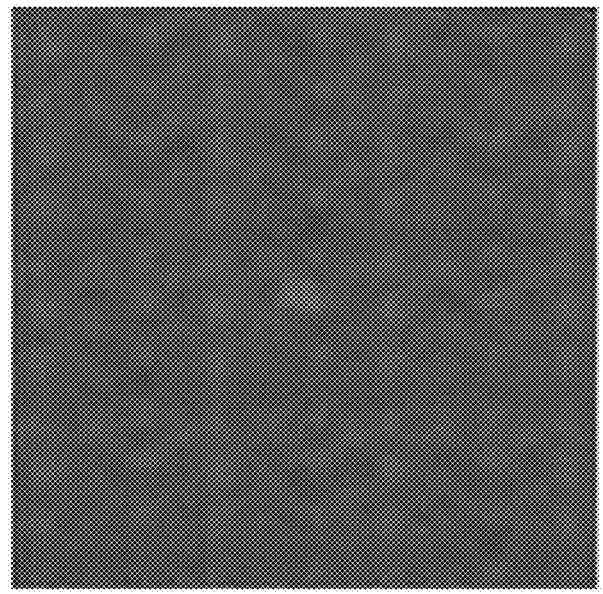
FIG. 14A, FIG. 14B, FIG. 15A, and FIG. 15B are photographs of a liquid crystal display.
Figure 14B:
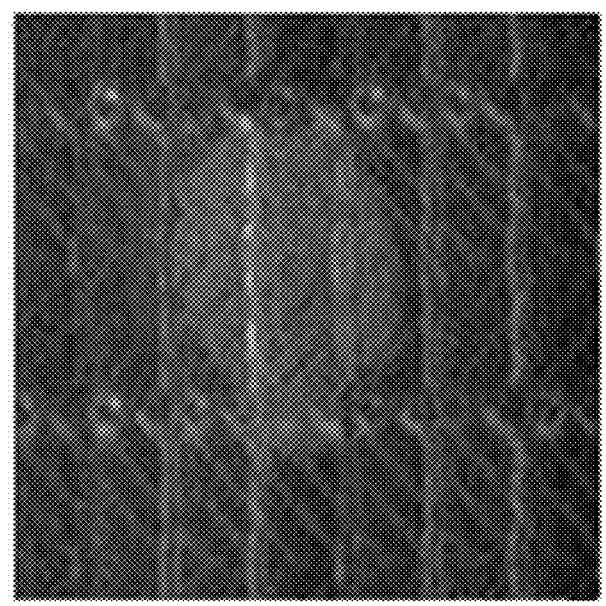
Figure 15A:
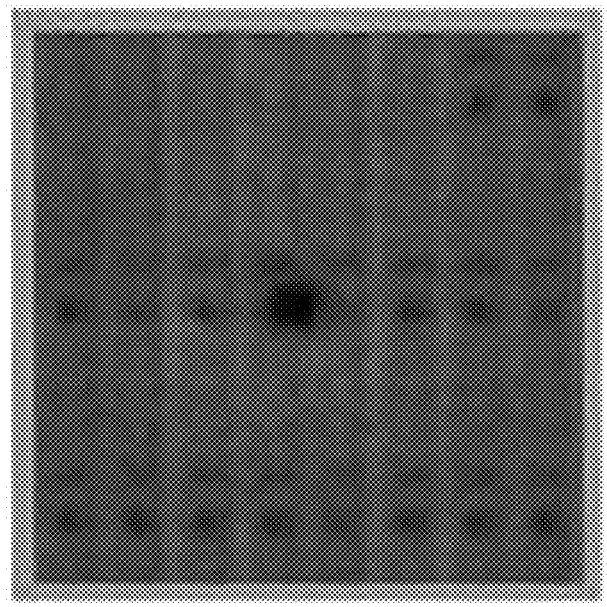
Figure 15B:
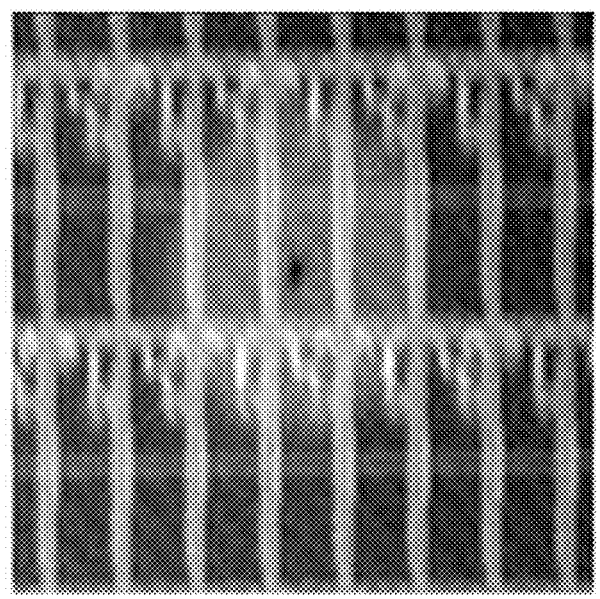

When forming the alignment layer in the liquid crystal display by using polyimides manufactured in Exemplary Embodiment 1 and Comparative Example 1, whether the alignment layer is uniformly coated is measured, and the results are shown in FIG. 14A, FIG. 14B, FIG. 15A, and FIG. 15B. FIG. 14A and FIG. 14B are photographs of the liquid crystal display of Exemplary Embodiment 1 and Comparative Example 1 when foreign particles do not exist in the pixel, and FIG. 15A and FIG. 15B are photographs of the liquid crystal display of Exemplary Embodiment 1 and Comparative Example 1 when foreign particles exist in the pixel. Regardless of the existence of the foreign particles in the pixel, the printing fault of the alignment layer is smaller in Exemplary Embodiment 1 than Comparative Example 1.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An alignment layer comprising a polyimide, wherein the polyimide is derived from a composition comprising:
a dianhydride-based compound; and
a compound represented by Chemical Formula 1:

[Chemical Formula 1]

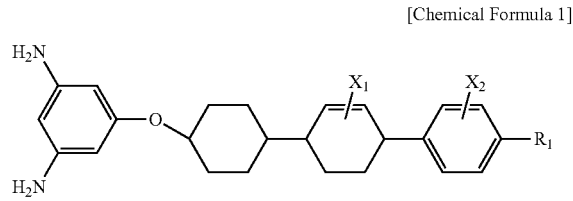

wherein $X_1$ and $X_2$ each independently comprise F, Cl, or CN, and wherein $R_1$ comprises at least one of a substituted or non-substituted $C_1$-$C_{12}$ alkyl group, a substituted or non-substituted $C_1$-$C_{12}$ alkoxy group, a substituted or non-substituted $C_1$-$C_{12}$ halogen-containing alkyl group, and a substituted or non-substituted $C_1$-$C_{12}$ halogen-containing alkoxy group.

2. The alignment layer of claim 1, wherein an imidization ratio of the alignment layer is greater than 70%.

3. The alignment layer of claim 1, wherein composition comprises 40 mol % to 60 mol % of the dianhydride-based compound.

4. The alignment layer of claim 3, wherein the composition comprises 10 mol % to 20 mol% of the compound represented by Chemical Formula 1.

5. The alignment layer of claim 4, wherein the composition further comprises a compound represented by Chemical Formula 2:

[Chemical Formula 2]

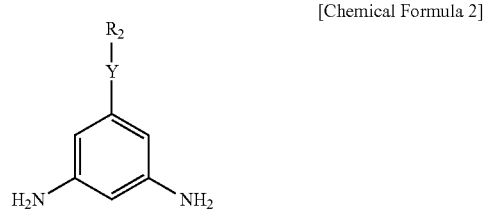

wherein Y comprises an oxygen atom, a carbonyl group, a carboxyl group, an amide group, a substituted or non-substituted $C_2$-$C_{12}$ alkylene group, or a substituted or non-substituted $C_2$-$C_{12}$ phenylene group, and wherein $R_2$ comprises at least one of a substituted or non-substituted $C_1$-$C_{12}$ alkyl group, a substituted or non-substituted $C_1$-$C_{12}$ alkoxy group, a substituted or non-substituted $C_1$-$C_{12}$ halogen-containing alkyl group, and a substituted or non-substituted $C_1$-$C_{12}$ halogen-containing alkoxy group.

6. The alignment layer of claim 5, wherein the composition comprises 25 mol % to 45 mol % of the compound represented by Chemical Formula 2.

7. The alignment layer of claim 1, wherein the composition comprises 10 mol % to 20 mol % of the compound represented by Chemical Formula 1.

8. The alignment layer of claim 7, wherein the imidization ratio of the alignment layer is greater than 70%.

9. The alignment layer of claim 1, wherein the dianhydride-based compound comprises a compound represented by at least one of Chemical Formula 3, and Chemical Formula 4:

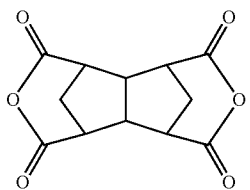

[Chemical Formula 3]

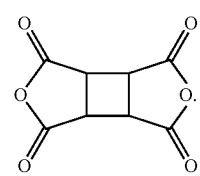

[Chemical Formula 4]

10. A liquid crystal display, comprising:
a first substrate;
a second substrate facing the first substrate;
a liquid crystal layer disposed between the first substrate and the second substrate; and
an alignment layer disposed between the first substrate and the second substrate,
wherein the alignment layer comprises a polyimide derived from a composition comprising:
a dianhydride-based compound; and
a compound represented by Chemical Formula 1:

[Chemical Formula 1]

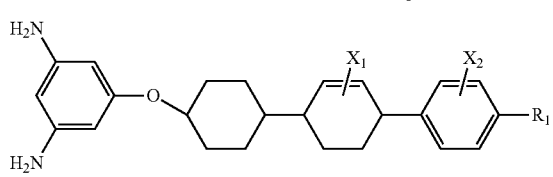

wherein $X_1$ and $X_2$ each independently comprise F, Cl, or CN, and wherein $R_1$ comprises at least one of a substituted or non-substituted $C_1$-$C_{12}$ alkyl group, a substituted or non-substituted $C_1$-$C_{12}$ alkoxy group, a substituted or non-substituted $C_1$-$C_{12}$ halogen-containing alkyl group, and a substituted or non-substituted $C_1$-$C_{12}$ halogen-containing alkoxy group.

11. The liquid crystal display of claim 10, further comprising:
a gate line disposed on the first substrate;
a first data line disposed on the first substrate;
a second data line disposed on the first substrate;
a first thin film transistor connected to the gate line and the first data line;
a second thin film transistor connected to the gate line and the second data line;
a first sub-pixel electrode connected to the first thin film transistor; and
a second sub-pixel electrode connected to the second thin film transistor.

12. The liquid crystal display of claim 11, wherein the first sub-pixel electrode and the second sub-pixel electrode each comprise a main branch and a plurality of sub-branches connected to the main branch, the plurality of sub-branches comprising a pectinated pattern.

13. The liquid crystal display of claim 12, wherein an imidization ratio of the alignment layer is greater than 70%.

14. The liquid crystal display of claim 12, wherein the composition comprises 40 mol % to 60 mol % of the dianhydride-based compound.

15. The liquid crystal display of claim 14, wherein the composition comprises 10 mol % to 20 mol % of the compound represented by Chemical Formula 1.

16. The liquid crystal display of claim 15, wherein the composition further comprises a compound represented by Chemical Formula 2:

[Chemical Formula 2]

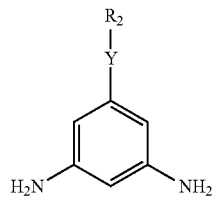

wherein Y comprises an oxygen atom, a carbonyl group, a carboxyl group, an amide group, a substituted or non-substituted $C_2$-$C_{12}$ alkylene group, or a substituted or non-substituted $C_2$-$C_{12}$ phenylene group, and wherein $R_2$ comprises at least one of a substituted or non-substituted $C_1$-$C_{12}$ alkyl group, a substituted or non-substituted $C_1$-$C_{12}$ alkoxy group, a substituted or non-substituted $C_1$-$C_{12}$ halogen-containing alkyl group, and a substituted or non-substituted $C_1$-$C_{12}$ halogen-containing alkoxy group.

17. The liquid crystal display of claim 16, wherein the composition comprises 25 mol % to 45 mol % of the compound represented by Chemical Formula 2.

18. The liquid crystal display of claim 11, wherein the first sub-pixel electrode and the second sub-pixel electrode each comprise an inclination direction determining member, and wherein the inclination direction determining member comprises a cutout.

19. The liquid crystal display of claim 18, wherein the imidization ratio of the alignment layer is greater than 70%.

20. The liquid crystal display of claim 18, wherein the composition comprises 40 mol % to 60 mol % of the dianhydride-based compound.

* * * * *